March 26, 1940.  E. MOLLOY  2,195,035
WING FLAP OPERATING AND OVERLOAD SAFETY DEVICE
Filed Feb. 10, 1938  2 Sheets-Sheet 1

INVENTOR
EDDIE MOLLOY.
BY
ATTORNEY

March 26, 1940. E. MOLLOY 2,195,035
WING FLAP OPERATING AND OVERLOAD SAFETY DEVICE
Filed Feb. 10, 1938 2 Sheets-Sheet 2
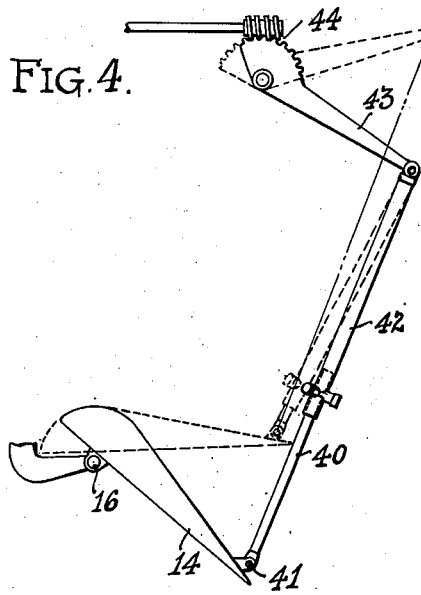
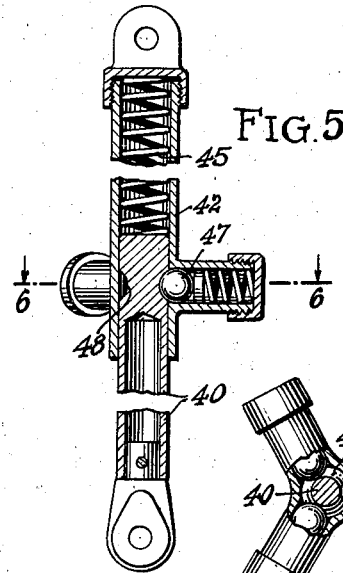
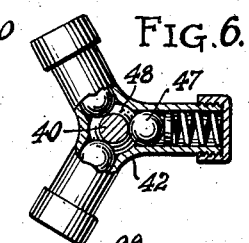
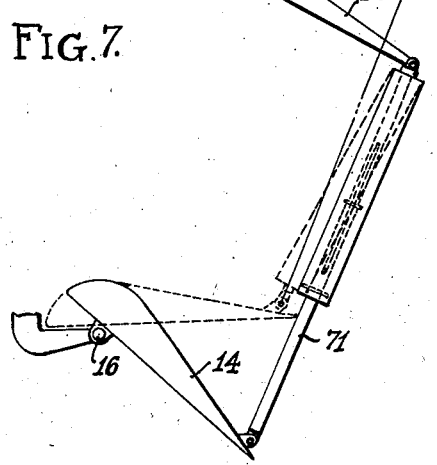
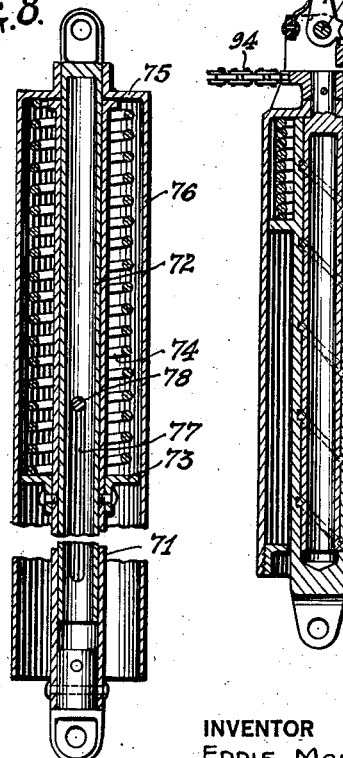
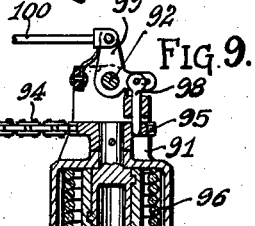
INVENTOR
EDDIE MOLLOY.
BY
ATTORNEY Patented Mar. 26, 1940

2,195,035

UNITED STATES PATENT OFFICE 2,195,035

WING FLAP OPERATING AND OVERLOAD SAFETY DEVICE

Eddie Molloy, Buffalo, N. Y., assignor to Curtiss-Wright Corporation, a corporation of Delaware Application February 10, 1938, Serial No. 189,769

2 Claims. (Cl. 244—42)

The present invention relates to safety and operating devices for use in connection with lift increasing flaps on aircraft sustaining surfaces.

In modern aircraft, the use of trailing edge lift increasing flaps has become quite prevalent, since these flaps permit of lower landing speeds, or a normal landing speed with an increase in maximum speed. Conventional operating mechanisms for flaps of this kind have involved positively operated irreversible mechanical drives or hydraulic drives, and these present certain operational disadvantages which at times result in damage to the flaps. It will be appreciated that at high air speeds, the pressure on extended trailing edge flaps becomes very great, and their utility under high speed conditions is negligible. Accordingly, operating instructions are frequently given to pilots, directing them not to lower flaps at speeds over, for instance, one hundred M. P. H., and to retract the flaps before speeds of more than one hundred M. P. H. are reached. Thus, the air loads on the flaps will not become excessive with possible damage to the flaps or operating mechanism. Flaps are also used in seaplanes and flying boats, and in making water landings, they are sometimes damaged by heavy spray in rough water, the weight of water hitting the flaps being sufficient to cause damage. These disadvantages are largely overcome by the provisions of this invention, which contemplates as an objective the use of overload release mechanisms in connection with the flap operating mechanism by which, when air or other loads on the flaps become excessive, the flaps may yield or retract, while still permitting of automatic extension of the flaps when the damaging force has been relieved.

A further object is to provide positively operable extending and retracting means for flaps, embodying overload release devices by which the flaps may retract due to externally applied forces. Various alternative forms of overload release devices are feasible, and a number of such forms are shown in the drawings, in which:

Fig. 4 is an elevation of an alternative form of flap operating and safety device adapted for mechanical control;

Fig. 5 is an enlarged detailed section of a part of the mechanism of Fig. 4;

Fig. 6 is a partial section on the line 6—6 of Fig. 5;

Fig. 7 is an elevation of a further alternative embodiment of flap operating and safety device;

Fig. 8 is an enlarged longitudinal section through part of the structure of Fig. 8; and Fig. 9 is an enlarged longitudinal section through another embodiment of the invention.

Figure 1:
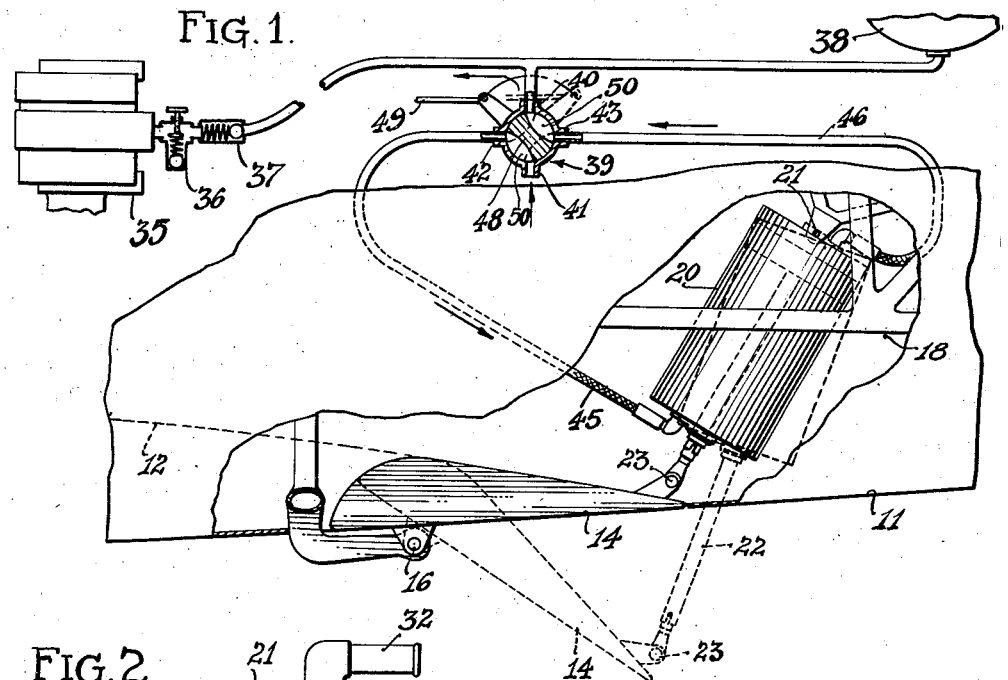
Fig. 1 is a diagrammatic fragmentary view of an aircraft showing one form of pneumatic flap moving and safety device.
Figure 2:
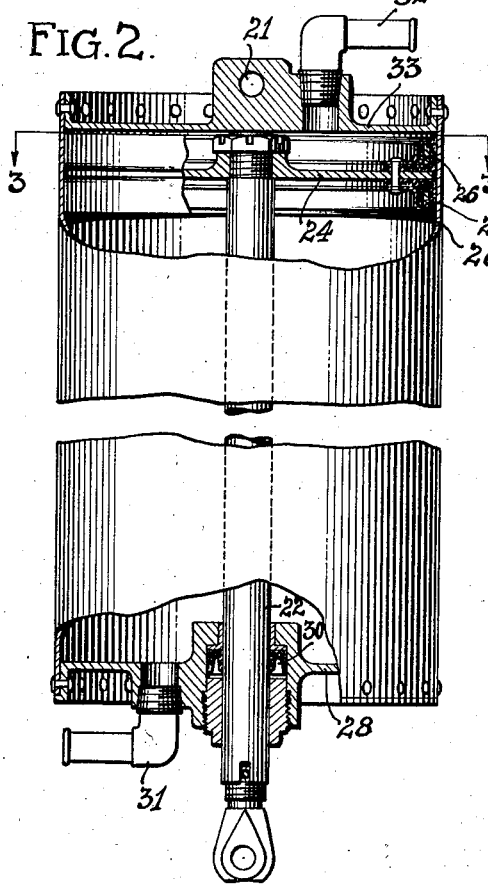
Fig. 2 is an enlarged elevation partly in section, showing the construction of the operating cylinder.
Figure 3:
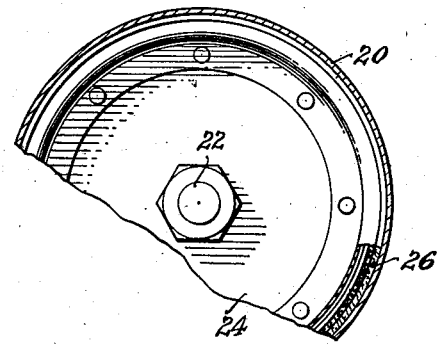
Fig. 3 is a section on the line 3—3 of Fig. 2.

Reference may now be made to Figs. 1, 2 and 3 in which I show a portion 11 of an aircraft fuselage from which a wing, indicated at 12 extends. To a rearward portion of the wing 12, a flap 14 is hinged as at 16, the flap being movable as shown in Fig. 1, between an upper position wherein it forms a substantial prolongation of the wing chord, and a lower position shown in dotted lines, in which it affords means for increasing the wing lift. To structure 18 of the fuselage, a cylinder 20 is pivoted as at 21, the cylinder carrying a piston rod 22 pivoted as at 23 to the flap 14. To the piston rod is attached a piston 24 having opposed packings 26 and 27 engaging the walls of the cylinder, and the piston rod 22 is packed with respect to the lower head 28 of the cylinder 20 as at 30. A pipe connection 31 is attached to the lower cylinder head 20 and communicates with the interior of the cylinder, and a connection 32 is attached to the upper cylinder head 33 and communicates with cylinder interior.

Within the aircraft is a suitable vacuum pump 35, driven by the engine, which is connected through a relief valve 36 and a check valve 37 to a balancing tank 38 and a valve unit 39. The valve unit includes a pump port 40, an opposed vent port 41, and ports 42 and 43 respectively connected to the connections 31 and 33 by conduits 45 and 46. A valve plunger 48 is arranged for manual control as at 49 and is provided with ducts 50 to establish communication, selectively, between the ports 41, 42, and 43, 40, on the one hand, and between ports 41, 43, and 42, 40, on the other hand. The relief valve 36 is adjusted to maintain approximately one-half atmosphere in the balance tank 38 and the system generally. The check valve 37 serves to maintain low pressure in the balance tank 38 when the pump 35 is not in operation.

It will be apparent from the description above that the valve 39 may be selectively adjusted to extend or retract the flap 14. If suction is connected to the line 45, the low pressure in the bottom part of the cylinder 20 will cause extension of the flap, the upper part of the cylinder being vented to atmosphere. The size of the cylinder 20, along with the degree of pressure difference above and below the piston 24 will be so arranged as to hold the flap in its lowered position in conditions of flight speed wherein the flap serves a useful function. If the flight speed increases with consequent increase in pressure on the lower surface of the flap, the cylinder and associated parts permit yield of the flap toward a retracted position. Likewise, if loads on the flap, due to water-splash or the like become excessive, the flap may yield upwardly. If the flap is to be retracted, the valve 39 is adjusted to the position shown in full lines whereupon atmospheric pressure is established in the lower part of the cylinder and wherein the suction pump is connected to the upper part, the difference in pressure effecting flap retraction. The balance tank 38, when the pump 35 is operating will maintain substantially one-half atmosphere of pressure which will be held therein by the check valve 37 should the pump 35 cease operation. Thus, the tank 38 will serve to permit of flap extension or retraction even though the pump may have ceased functioning.

Although a vacuum pump has been mentioned, air pressure can be used instead with virtually no change in structure except to change the valves 36 and 37 end-for-end.

In Figs. 4, 5 and 6, I show an alternative mechanical arrangement wherein a plunger 40 is pivoted at 41 to the flap 14 and extends into a cylinder 42 pivoted at its upper end to an arm 43 which may be annularly adjusted through a worm-and-sector mechanism 44, controllable by the pilot. Within the cylinder 42 is a compression spring 45 urging plunger 40 outwardly with respect to the cylinder 42. Spring pressed ball detents 47 engage a groove 48 formed in the plunger to hold the plunger, normally, in a fixed extended position with respect to the cylinder 42. Normal retraction and extension of the flap 14 is effected by operating the mechanism 44. When the flap is extended and if excessive loads are imposed thereon, the detents 47 will release the plunger 40, permitting it to yield upwardly against the spring 45, to the relief of the loading on the flap 14. Upon cessation of the excessive loading, the spring 45 will extend the plunger 40 permitting of reengagement of the detents 47 in the plunger groove 48.

Figs. 7 and 8 show an arrangement somewhat similar to that of Figs. 4, 5 and 6 wherein the strut joining the flap 14 with the arm 43 comprises a plunger 71 pivoted to the flap at its lower end and sliding over a tube 72 at its upper end, said tube being pivoted to the arm 43. The plunger is provided with an abutment flange 73 against which the lower end of a compression spring 74 rests, the upper end of said spring abutting upon a flange 75 fixed to the tube 72. Said flange 75 is provided with a depending protecting sleeve 76 embracing the spring 74. The tube 72 is provided with a slot 77 engaged by a cross-pin 78 passing through the plunger 71, this pin and slot connection serving to limit the amount of extension or retraction of the plunger 71 with respect to the tube 72. The operation of this device is substantially the same as that described in connection with Figs. 4, 5 and 6, except that no detents are used. Overload on the flap 14 will cause telescoping of the tube 72 relative to the plunger 71, against the resilient action of the spring 74.

In Fig. 9, I show an alternative mechanical arrangement for operating the flap 14, this consisting of a rotatable screw shaft 90 having a steeply pitched external screw thread. The shaft is journalled in a fitting 91 pivoted at 92 to the aircraft structure. Engaging the screw shaft 90 is an internally threaded sleeve 93 which is pivoted at its lower end to the flap 14. The steep pitch of the coacting threads on the elements 90 and 93 provide for reversible action. Manual extension or retraction of the flap is effected by rotating the shaft 90 by means of a chain 94 engaging a sprocket 95 carried by the shaft 90. A compression spring 96 is engaged between a flange 97 on the sleeve 93 and a portion of the bracket 91, this spring constantly urging the flap toward an extended position. This spring will be sufficient in rate to overcome the friction of the mechanism, so that, if the flap be extended, and overloads are imposed thereon, the sleeve 93 will rise against the spring 96, at the same time turning the shaft 90 and the control device. When the overload is relieved, the spring will urge the flap to its lowered position, at the same time turning the control mechanism. In this construction, any overload on the flap when same is in an operative position will be automatically relieved, and at the same time, the overload condition will be indicated to the aircraft crew by the movement of the control devices, thus serving as a visual warning to the crew that an overload condition exists. If the air speed condition is such that the flap should be retracted, the crew may then manually turn the shaft 90 to retract the flap, and may lock it in its retracted position by engaging a pin 98 with the sprocket 95 through the medium of a bell-crank 99 and a control rod 100 extending therefrom to the crew quarters.

This locking pin organization may, if desired, be so arranged that the screw shaft 90 is only lockable when the flap is retracted. Thus, if the flap be extended, it is always capable of yielding due to overload.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What I claim is:

1. In aircraft having a wing, a trailing edge flap hinged thereto, a member movable relative to the aircraft, and a link connecting said member with the flap for imparting movement of the member to the flap, said link comprising a cylinder and a plunger slidable therein and a spring urging said plunger toward extension from the cylinder, said link comprising a resilient, normally extended, compressible strut, and a resilient pressed detent between said cylinder and plunger for holding them in extended relationship, said detent being releasable upon imposition of overload on said flap to permit the flap to rise, due to overload, by compression of the resilient strut.

2. In aircraft having a wing, a movable flap hinged thereto, a member movable relative to the aircraft, and a resiliently compressible link connecting the flap and member, said link including a detent mechanism normally holding the link in extended position, said detent mechanism being disengageable upon imposition of excessive loads on the link to allow compression thereof.

EDDIE MOLLOY.